US011262946B2

(12) United States Patent
Bavishi et al.

(10) Patent No.: US 11,262,946 B2
(45) Date of Patent: Mar. 1, 2022

(54) CACHE-BASED MEMORY READ COMMANDS

(71) Applicant: Micron Technology, Inc., Boise, ID (US)

(72) Inventors: Dhawal Bavishi, San Jose, CA (US); Patrick A. La Fratta, McKinney, TX (US)

(73) Assignee: Micron Technology, Inc., Boise, ID (US)

(*) Notice: Subject to any disclaimer, the term of this patent is extended or adjusted under 35 U.S.C. 154(b) by 128 days.

(21) Appl. No.: 16/694,105

(22) Filed: Nov. 25, 2019

(65) Prior Publication Data

US 2021/0157517 A1 May 27, 2021

(51) Int. Cl.
*G06F 3/06* (2006.01)
*G06F 12/0802* (2016.01)

(52) U.S. Cl.
CPC .......... *G06F 3/0659* (2013.01); *G06F 3/0604* (2013.01); *G06F 3/0679* (2013.01); *G06F 12/0802* (2013.01)

(58) Field of Classification Search
CPC .... G06F 3/0659; G06F 3/0604; G06F 3/0679; G06F 12/0802
See application file for complete search history.

(56) References Cited

U.S. PATENT DOCUMENTS

| 10,296,230 | B1* | 5/2019 | Balakrishnan | ........... G11C 7/22 |
| 2010/0318761 | A1* | 12/2010 | Moyer | ................ G06F 12/1036 |
| | | | | 711/207 |
| 2018/0004668 | A1* | 1/2018 | Azizi | .................. G06F 12/0868 |
| 2018/0188953 | A1* | 7/2018 | Wang | ................. G11C 16/3418 |
| 2020/0042412 | A1* | 2/2020 | Kulkarni | ............... G06F 3/0635 |
| 2020/0226115 | A1* | 7/2020 | Wolfson | .............. G06F 11/1453 |

* cited by examiner

*Primary Examiner* — Nanci N Wong
(74) *Attorney, Agent, or Firm* — Schwegman Lundberg & Woessner, P.A.

(57) ABSTRACT

Various embodiments described herein provide for selectively sending a cache-based read command, such as a speculative read (SREAD) command in accordance with a Non-Volatile Dual In-Line Memory Module-P (NVDIMM-P) memory protocol, to a memory sub-system.

20 Claims, 8 Drawing Sheets

CACHE-BASED MEMORY READ COMMANDS

TECHNICAL FIELD

Embodiments of the disclosure relate generally to memory sub-systems and, more specifically, relate to cache-based read commands.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to selectively sending a cache-based read command to a memory sub-system, such as a memory sub-system that uses a non-deterministic memory protocol (e.g., a Non-Volatile Dual In-Line Memory Module-P (NVDIMM-P) memory protocol). A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices that store data. The host system can provide data to be stored at the memory sub-system and can request data to be retrieved from the memory sub-system.

Some non-deterministic memory protocols, such as a NVDIMM-P memory protocol, permit a host system to send a memory sub-system different types of memory sub-system read commands that can send data (back to the host system) in a deterministic length of time or non-deterministic length of time depending on the situation. For instance, where a host system (acting as a master or initiator device) and a memory sub-system (acting as a slave or target device) are coupled through an NVDIMM-P interface, the host system can use a regular read (XREAD) command for data at a specified memory address, or can use a speculative read command (SREAD) command for data at the specified memory address. With the XREAD command, the memory sub-system can take a non-deterministic length of time to fetch data from the specified memory address and then send an indication to the host system (e.g., on the RSP_n signal line) that the data is ready to be sent to the host system. In contrast, with the SREAD command, the host system can request that the data at the specified memory address be read from a cache of the memory sub-system and, in response to the SREAD command, the memory sub-system can send the host system an indication (e.g., as metadata) of whether the SREAD resulted in a cache hit or a cache miss (also referred to as a "SREAD hit" and a "SREAD miss") after a deterministic length of time. If the cache hit (SREAD hit) occurs from the SREAD command, the requested data is returned (e.g., on the DQ signal line) with the cache hit/miss indicator. If, however, a cache miss (SREAD miss) occurs from the SREAD command, after the memory sub-system sends indication that a cache miss has occurred (e.g., as metadata), the memory sub-system can fetch the data from the specified memory address and send an indication to the host system (e.g., on the RSP_n signal line) that the data is ready to be sent to the host system.

Accordingly, in a best-case scenario, with a SREAD command, a memory sub-system can provide a host system with data in a deterministic length of time when a cache hit occurs, which can be better than the non-deterministic length of time taken by an XREAD command. However, where a cache miss occurs, a SREAD command can result in an extra cost (e.g., penalty) for the memory sub-system, as the memory sub-system has to respond to the host system with a cache miss (whereas an XREAD does not need to do so) and this response occupies the data bus. In contrast, because a XREAD command does not perform this extra step (of indicating a cache hit/miss), a XREAD command can provide a host system with a guarantee of when the data will be busy with data of the read response. As such, a cache/SREAD miss in response to a SREAD command can represent an opportunity cost, where the memory sub-system could have used the data bus to actually send data to the host system (e.g., using a XREAD command).

Aspects of the present disclosure address the above and other deficiencies by selectively sending (e.g., issuing) a cache-based read memory sub-system command, such as an SREAD command, from a host system to a memory sub-system based on a history of past memory sub-system commands sent from the host system to the memory sub-system. For some embodiments, the history of past memory sub-system commands sent from the host system to the memory sub-system is used to determine whether sending a cache-based memory sub-system read command will likely result in a cache miss (e.g., SREAD miss), which can result in the memory sub-system providing data requested by the read command in a deterministic length of time ("deterministic time") rather than a non-deterministic length of time ("non-deterministic time").

For instance, according to some embodiments where a host system serves as a NVDIMM-P initiator and a memory sub-system serves as a NVDIMM-P target, the host system includes a content addressable memory (CAM) for storing one or more tags that each identify a memory address associated with a NVDIMM-P memory sub-system command previously sent from the host system to the memory sub-system. For instance, a tag stored on the CAM can represent a memory address referenced by a memory sub-system command (e.g., XREAD command) that was previously sent from the host system to the memory sub-system and that would likely cause the data stored at that memory address to be currently stored in the cache of the memory sub-system. The CAM can store a timestamp for each tag (e.g., to calculate age of the tag) and can also store data for tracking valid and dirty bits for each tag. For some embodiments, when the host system intends to send the memory sub-system a read command in accordance with a NVDIMM-P memory protocol, the host system uses the CAM (e.g., specifically, the one or more tags stored thereon) to determine whether the host system should send a NVDIMM-P cache-based read command (e.g., SREAD command) to the memory sub-system to perform the read command rather than some other NVDIMM-P read command (e.g., XREAD command). In this way, the host system can send a NVDIMM-P cache-based read command (e.g., SREAD command) when the probability of a cache hit (e.g., a SREAD hit) for the command is high, and to send some other NVDIMM-P read command (e.g., XREAD command) when the probability of a cache hit is not high.

Generally, in comparison to the use of a non-cache based read command, a cache hit (e.g., a SREAD hit) for a cache-based read command (e.g., SREAD) can result in better performance for a memory sub-system, while a cache miss (e.g., a SREAD miss) for the cache-based read command can result in worse performance for the memory sub-system. Accordingly, compared to traditional approaches/techniques for sending cache-based read commands to a memory sub-system, the selective sending of the cache-based read command as described herein can improve the overall performance (e.g., read performance) of the memory sub-system.

As used herein, a cache-based memory sub-system read command can include a memory sub-system read command that causes a memory sub-system to send requested data back (e.g., send an indication that the requested data is ready to be read) in a deterministic length of time when the requested data is stored on a cache (e.g., read cache) of the memory sub-system. A cache-based memory sub-system read command can result in the memory sub-system sending a cache miss response if the requested data is not currently stored on the cache. After sending the cache miss response, the memory sub-system can, in a non-deterministic (e.g., arbitrary) length of time, later send the requested data (e.g., send an indication that the requested data is ready to be read). During that non-deterministic length of time, the memory sub-system can be fetching the requested data from a memory device of the memory sub-system to the cache (e.g., read cache) of the memory sub-system. An example of a cache-based memory sub-system read command can include, without limitation, a SREAD command in accordance with a NVDIMM-P memory protocol.

As used herein, a non-cache-based memory sub-system read command can include a memory sub-system read command that causes a memory sub-system to send requested data back (e.g., send an indication that the requested data is ready to be read) in a non-deterministic (e.g., arbitrary) length of time. During that non-deterministic length of time, the memory sub-system can be fetching the requested data from a memory device of the memory sub-system to the cache (e.g., read cache) of the memory sub-system. An example of a cache-based memory sub-system read command can include, without limitation, a XREAD command in accordance with a NVDIMM-P memory protocol.

Though various embodiments are described herein with respect to selectively sending a cache-based read memory sub-system command based on a history of past memory sub-system commands sent from the host system to the memory sub-system, some embodiment use alternative or additional approaches for determining the likelihood that data from a given memory address is currently stored on the cache of the memory sub-system and selectively sending a cache-based read memory sub-system command based on that likelihood. For example, the host system can be aware of how the memory sub-system tracks or manages data within the memory sub-system's cache and, based on this awareness, perform similar host-side tracking of data contents in the cache. For instance, where the memory sub-system tracks cache data contents using a counter or a tag-store approach with a least recently used (LRU) policy, the host system can use the same tracking approach to determine the likelihood that requested data is stored in the cache of the memory sub-system.

Disclosed herein are some examples of systems that can selectively send a cache-based read command to a memory sub-system, as described herein.

Figure 1:
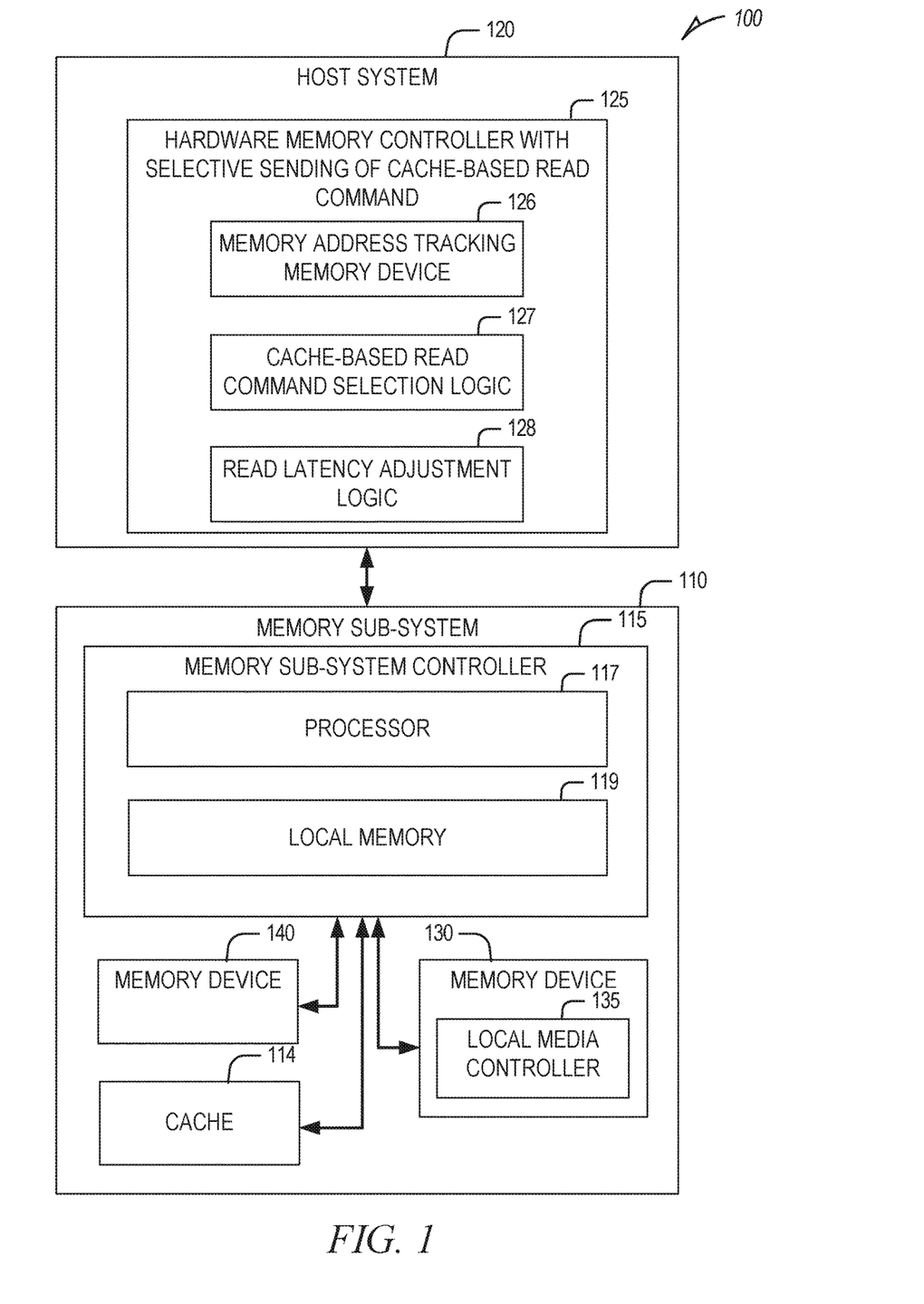
FIG. 1 illustrates an example computing environment that includes a memory sub-system, in accordance with some embodiments of the present disclosure.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as 3D cross-point type and NAND type flash memory are described, the memory device 130 can be based on any other type of non-volatile memory, such as read-only memory (ROM), phase change memory (PCM), self-selecting memory, other chalcogenide based memories, ferroelectric random access memory (FeRAM), magneto random access memory (MRAM), negative-or (NOR) flash memory, electrically erasable programmable read-only memory (EEPROM), and a cross-point array of non-volatile memory cells.

One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130).

In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a cache 114 used for caching data during execution of operations of the memory sub-system 110, such as a read operation or a write operation. The cache 114 can include a cache that is present at the frontend of the memory sub-system 110, while the memory devices 130, 140 can be present at the backend of the memory sub-system 110. Generally, the cache 114 has faster access performance than one or more of the memory devices (e.g., 130, 140) of the memory sub-system 110.

The host system 120 includes a hardware memory controller 125 with selective sending of cache-based read command, which implements at least a portion of some embodiments described herein. According to some embodiments, the hardware memory controller 125 processes memory requests, such as read or write requests, generated by the processing device of the host system 120 (e.g., as the processing device executes a software application). As shown, the hardware memory controller 125 includes a memory address tracking memory device 126, a cache-based read command selection logic 127, and a read latency adjustment logic 128. The hardware memory controller 125 can, for example, be coupled to a processing device (e.g., central processing unit (CPU)) of the host system 120. For instance, the hardware memory controller 125 can represent a north bridge chip or chipset, which can facilitate interactions between a processing device of the host system 120 and the memory sub-system 110.

The memory address tracking memory device 126 is used by the hardware memory controller 125 to store one or more memory addresses associated with one or more prior memory sub-system commands (e.g., read commands or write commands) sent to the memory sub-system 110, which is coupled to the host system 120. Depending on the embodiment, one of the prior sub-system commands can be a memory sub-system command (e.g., read, write, or some other command) that it known to result in data associated with the memory address being stored in (e.g., fetched to) a cache (e.g., the cache 114) of the memory sub-system 110. As described herein, this storage of data on the cache can result in a cache hit when the hardware memory controller 125 sends a cache-based memory sub-system read command to the memory sub-system 110. For some embodiments, the hardware memory controller 125 causes the memory address tracking memory device 126 to store a memory address associated with a (e.g., each) memory sub-system read command sent by the hardware memory controller 125 to the memory sub-system 110. Additionally, for some embodiments, a memory address is stored on the memory address tracking memory device 126 with a timestamp, which can represent an issue time at which a memory sub-system command associated with the memory address was issued from the hardware memory controller 125 to the memory sub-system 110. According to some embodiments, a memory address stored on the memory address tracking memory device 126 indicates that data stored on the memory sub-system 110 at the memory address is likely stored on the cache 114 (e.g., read cache) of the memory sub-system 110, which in turn indicates that a cache hit will likely result if a cache-based memory sub-system read command (e.g., SREAD command in accordance with a NVDIMM-P memory protocol) is sent from the hardware memory controller 125 to the memory sub-system 110. For some embodiments, the memory address tracking memory device 126 includes a CAM, which can enable search of its stored data contents in a single clock cycle. For some embodiments, the memory address tracking memory device 126 stores each respective memory address as a tag on the memory address tracking memory device 126, where the tag can be used to identify the respective memory address. For example, the tag of a respective memory address is generated based on at least a portion of the respective memory address (e.g., tag includes front portion or an end portion of a 64-bit memory address). Though the hardware memory controller 125 is shown as including the memory address tracking memory device 126, for some embodiments, the memory address tracking memory device 126 can be external to the hardware memory controller 125.

The cache-based read command selection logic 127 can cause (or otherwise enable) the hardware memory controller 125 to determine when the hardware memory controller 125 receives a memory request to read data from a given memory address of the memory sub-system 110. The memory request can be one sent to the hardware memory controller 125 from a processing device (e.g., CPU). Additionally, the memory request can be generated by the processing device of the host system 120. For instance, a software application or an operating system being executed by the processing device can cause the generation of the memory request. Thought not shown, the hardware memory controller 125 can include a hardware interface for receiving a memory request (e.g., to read or write data) for a memory address.

In response to receiving the memory request to read data, the cache-based read command selection logic 127 can cause (or otherwise enable) the hardware memory controller 125 to determine whether the given memory address is currently stored in the memory address tracking memory device 126. As described herein, the memory address tracking memory device 126 can include a CAM, which can enable a quick search of data contents of the memory address tracking memory device 126 (e.g., within a single clock cycle).

The cache-based read command selection logic 127 can cause (or otherwise enable) the hardware memory controller 125 to send a cache-based memory sub-system command (e.g., SREAD command in accordance with a NVDIMM-P memory protocol) to the memory sub-system for the given memory address based on determining whether the given memory address is currently stored in the memory address tracking memory device 126. For instance, the hardware memory controller 125 can send, to the memory sub-system 110, the cache-based memory sub-system command for the given memory address in response to determining that the given memory address is currently stored on the memory address tracking memory device 126.

Alternatively, for some embodiments, in response to determining that the given memory address is currently stored in the memory address tracking memory device 126, the hardware memory controller 125 can: determine current time accessible by the hardware memory controller 125; access, from the memory address tracking memory device 126, a timestamp (e.g., issue timestamp) stored in association with the given memory address; and determine, based on the current time, the timestamp, and an average read latency time of the memory sub-system 110, whether there is a likelihood that data from the given memory address is currently stored on the cache 114 of the memory sub-system 110. Eventually, the hardware memory controller 125 can send, to the memory sub-system 110, the cache-based memory sub-system command (e.g., SREAD command in accordance with a NVDIMM-P memory protocol) for the given memory address in response to determining that there is the likelihood that data from the given memory address is currently stored on the cache 114 of the memory sub-system 110. For instance, for some embodiments, there is a likelihood that data from the given memory address is currently stored on the cache 114 of the memory sub-system 110 when the current time is greater than a sum of the timestamp and the average read latency time. The current time being greater than a sum of the timestamp and the average read latency time can indicate that enough time has passed between a prior memory sub-system command (e.g., prior XREAD or SREAD command in accordance with a NVDIMM-P memory protocol) associated with the given memory address stored on the memory address tracking memory device 126 and the recently received memory request to read data from the memory sub-system 110 that there is a likelihood (e.g., high likelihood) that data associated with the given memory address is presently stored in the cache 114 as a result of the prior memory sub-system command (e.g., prior XREAD or SREAD command). Accordingly, for some embodiments, the hardware memory controller 125 sends the cache-based memory sub-system command for the given memory address in response to determining that a current time is greater than a sum of the timestamp and the average read latency time.

The current time can represent, for example, the time when the memory request to read data is received by the hardware memory controller 125. Depending on the embodiment, the current time can be provided by an entity external to the hardware memory controller 125, such as time maintained and provided by another component of the host system 120. The average read latency time can represent an estimated average response time for the memory sub-system 110 to copy data from a memory device (e.g., 130, 140) of the memory sub-system 110 to the cache 114. The average read latency time can be stored on the hardware memory controller 125 or on a memory device external to the hardware memory controller 125. Depending on the embodiment, the average read latency time can represent the estimated average response time that is currently known by the hardware memory controller 125. As described herein, the average read latency time can be adjusted (e.g., adapted or updated) over time by the hardware memory controller 125 via the read latency adjustment logic 128.

In another instance, the cache-based read command selection logic 127 can cause (or otherwise enable) the hardware memory controller 125 to send a non-cache-based memory sub-system command (e.g., XREAD command in accordance with a NVDIMM-P memory protocol) to the memory sub-system for the given memory address based on determining whether the given memory address is currently stored in the memory address tracking memory device 126. In particular, the hardware memory controller 125 can send a non-cache-based memory sub-system command to the memory sub-system for the given memory address in response to determining that the given memory address is not currently stored in the memory address tracking memory device 126.

Alternatively, for some embodiments, in response to determining that the given memory address is currently stored in the memory address tracking memory device 126, the hardware memory controller 125 can: determine current time accessible by the hardware memory controller 125; access, from the memory address tracking memory device 126, a timestamp (e.g., issue timestamp) stored in association with the given memory address; and determine, based on the current time, the timestamp, and an average read latency time of the memory sub-system 110, whether there is a likelihood that data from the given memory address is currently stored on the cache 114 of the memory sub-system 110. Eventually, the hardware memory controller 125 can send, to the memory sub-system 110, the non-cache-based memory sub-system command (e.g., XREAD command) for the given memory address in response to determining that there is not the likelihood that data from the given memory address is currently stored on the cache 114 of the memory sub-system 110. For instance, for some embodiments, there is little or no likelihood that data from the given memory address is currently stored on the cache 114 of the memory sub-system 110 when the current time is less than or equal to a sum of the timestamp and the average read latency time. The current time being less than or equal to a sum of the timestamp and the average read latency time can indicate that not enough time has passed between a prior memory sub-system command (e.g., read command) associated with the given memory address stored on the memory address tracking memory device 126 and the recently received memory request to read data from the memory sub-system 110 for data associated with the given memory address being presently stored in the cache 114 as a result of the prior memory sub-system command. Accordingly, for some embodiments, the hardware memory controller 125 sends the non-cache-based memory sub-system command for the given memory address in response to determining that current time is less than or equal to a sum of the timestamp and the average read latency time.

For some embodiments, in response to the hardware memory controller 125 sending a non-cache-based memory sub-system read command (e.g., XREAD command) for a given memory address to the memory sub-system 110, the hardware memory controller 125 can store (e.g., update) the given memory address on the memory address tracking memory device 126. If the given memory address is already stored on the memory address tracking memory device 126, the timestamp on the given memory address can be updated with a timestamp for when the non-cache-based memory sub-system read command was sent to the hardware memory controller 125 to the memory sub-system 110. As described herein, a memory address stored on the memory address tracking memory device 126 indicates that data stored on the memory sub-system 110 at the memory address is likely stored on the cache 114 (e.g., read cache) of the memory sub-system 110 (e.g., as a result of a prior memory sub-system read command sent for the given memory address). Accordingly, in view of the non-cache-based memory sub-system read command being sent from the hardware memory controller 125 to the memory sub-system 110, there is a higher likelihood that data stored on the memory sub-system 110 at the memory address is likely stored on the cache 114 (e.g., read cache) of the memory sub-system 110.

The read latency adjustment logic 128 can cause, or otherwise enable, the hardware memory controller 125 to adjust (e.g., update) an average read latency time based on a response from the memory sub-system 110 when the hardware memory controller 125 sends a cache-based memory sub-system read command to the memory sub-system 110. In particular, the hardware memory controller 125 can: determine whether a cache miss response (e.g., indicating a SREAD miss) is received from the memory sub-system 110 in response to the sending of the cache-based memory sub-system command (e.g., SREAD command in accordance with a NVDIMM-P memory protocol) to the memory sub-system 110; and adjust the average read latency time based on the determining that the cache miss response is received. For example, the cache miss response can include a cache "miss" code that can be sent from the memory sub-system 110 to the host system 120 over a metadata signal line in accordance with a NVDIMM-P memory protocol. Alternatively, the memory sub-system 110 can send a cache hit response in response to the sending of the cache-based memory sub-system command (e.g., SREAD command) to the memory sub-system 110. For some embodiments, the cache-based memory sub-system read command includes a SREAD command in accordance with a NVDIMM-P memory protocol, and a cache hit response can include a response on a RSP_n signal line that indicates that data is ready to be read by the host system 120 (via the hardware memory controller 125) from the memory sub-system 110. Depending on the embodiment, the adjustment of the average read latency time can be based on (e.g., according to): an average time probability (e.g., probability curve) of the memory sub-system 110 to fetch data from a memory device (e.g., 130, 140) to the cache 114 of the memory sub-system 110; an increment or decrement of predetermined amount of time; or some combination thereof. The adjustment can represent an adjustment of the expectation of the hardware memory controller 125 as to how long it takes the memory sub-system 110 to fetch data from a memory device (e.g., 130, 140) to the cache 114 of the memory sub-system 110.

In some embodiments, the memory devices 130 include local media controllers 135 that operate in conjunction with memory sub-system controller 115 to execute operations on one or more memory cells of the memory devices 130.

Further details with regards to the operations of the hardware memory controller 125 are described below.

Figure 2:
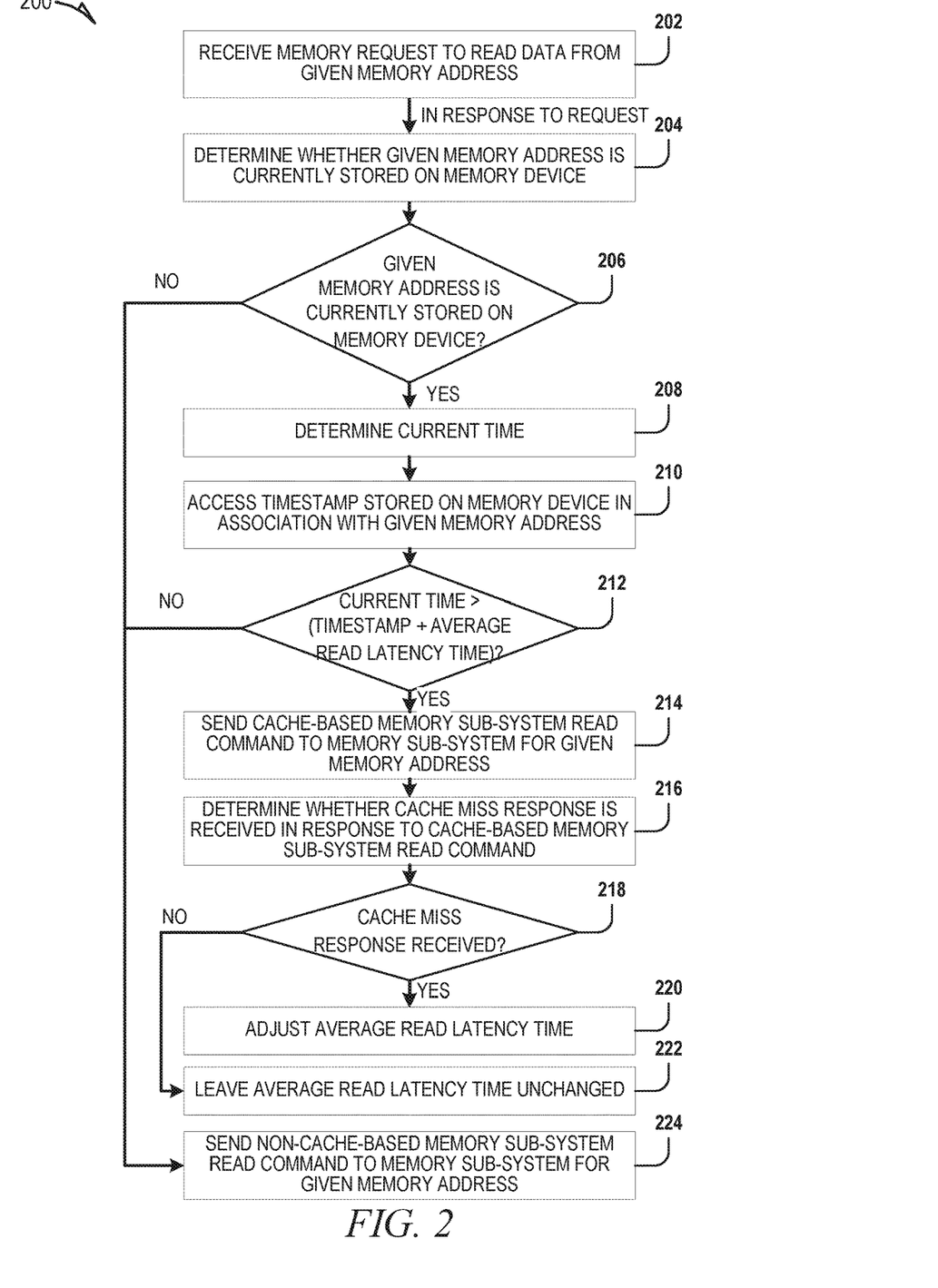
FIGS. 2 through 4 are flow diagrams of example methods for selectively sending a cache-based read command to a memory sub-system, in accordance with some embodiments of the present disclosure.
Figure 3:
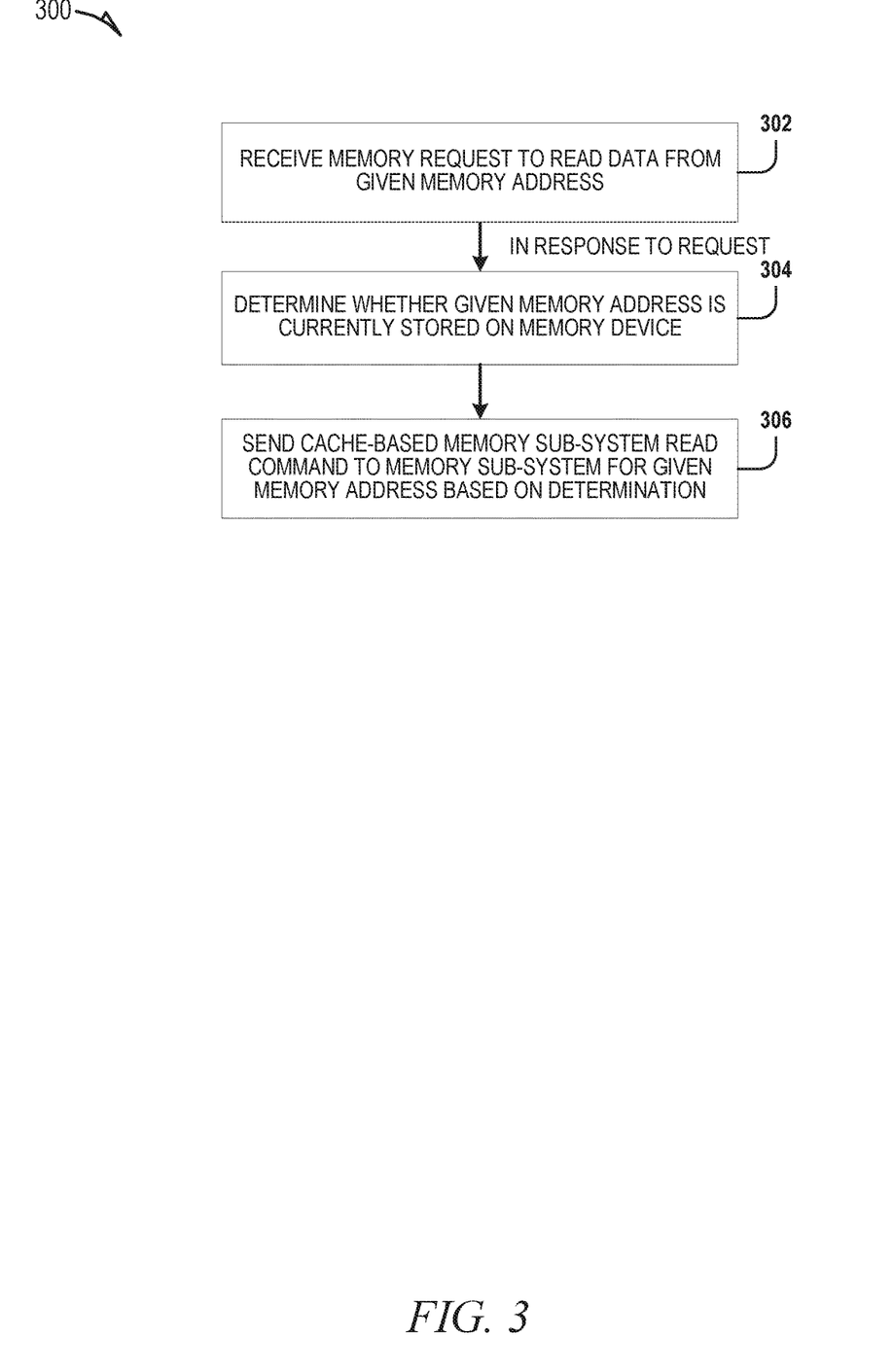
Figure 4:
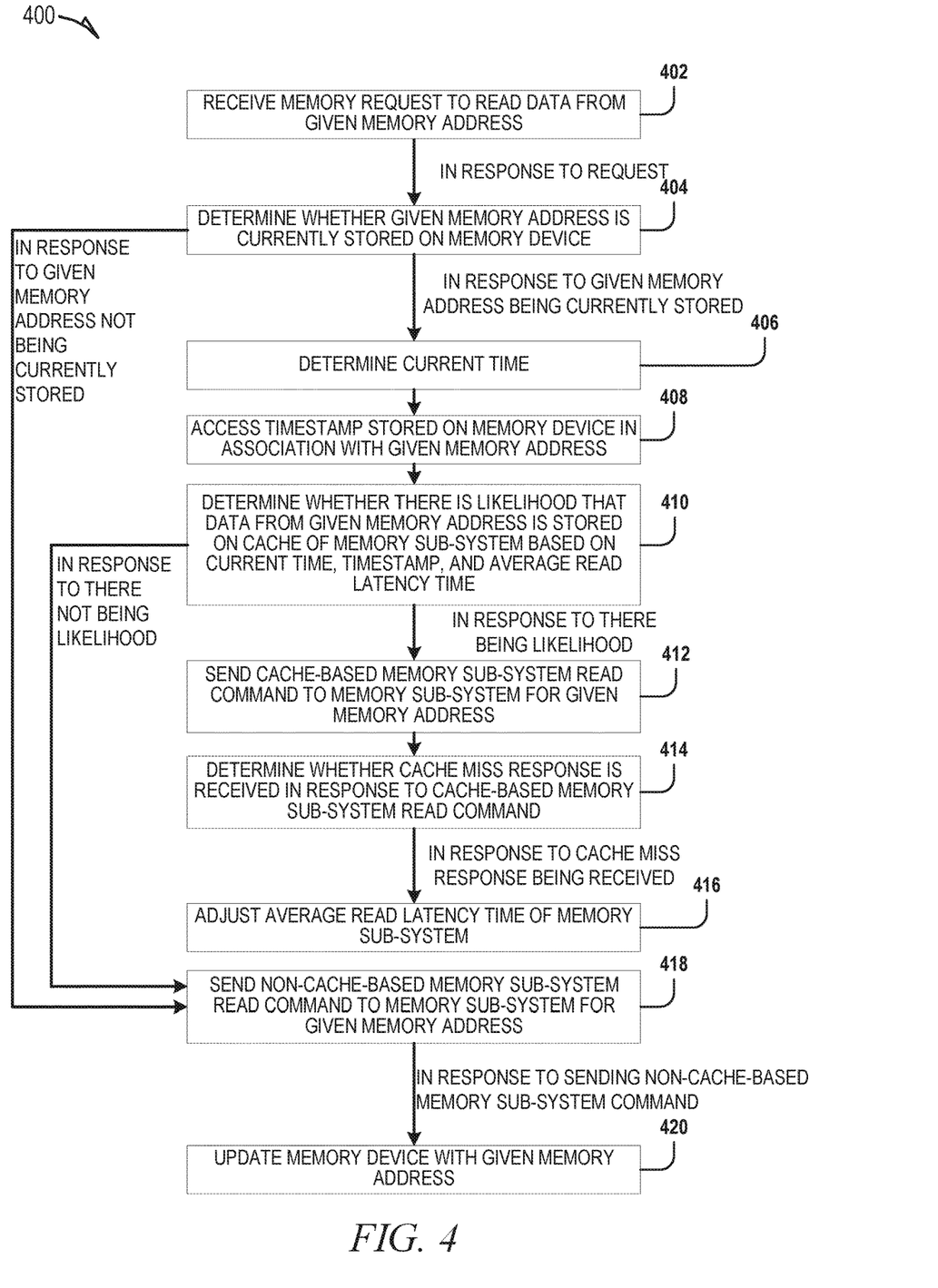

FIGS. 2 through 4 are flow diagrams of example methods for selectively sending a cache-based read command to a memory sub-system, in accordance with some embodiments of the present disclosure. The methods 200, 300, 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods 200, 300, 400 are performed by the hardware memory controller 125 of the host system 120 as described with respect to FIG. 1. Additionally, or alternatively, for some embodiments, the methods 200, 300, 400 are performed, at least in part, by the memory sub-system controller 115 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now to the method 200 of FIG. 2, at operation 202, a hardware memory controller (e.g., 125) of a host system (e.g., 120) receives a memory request to read data from a given memory address of a memory sub-system (e.g., 110). In response to the memory request received at operation 202, at operation 204, the hardware memory controller (e.g., 125) determines whether the given memory address is currently stored on a memory device (e.g., 126) of the hardware memory controller. If, at decision point 206, the given memory address is currently stored on the memory device, the method 200 proceeds to operation 208; otherwise; the method 200 proceeds to operation 224.

At operation 208, the hardware memory controller (e.g., 125) determines a current time known or accessible to the hardware memory controller. At operation 210, the hardware memory controller (e.g., 125) accessed a timestamp (e.g., issue a timestamp) stored on the memory device (e.g., 126) in association with the given memory address (determined to be stored in the memory device by operation 204). At decision point 212, if the current time determined by operation 208 is greater than the sum of the timestamp accessed by operation 210 and an average read latency time (as currently known by the hardware memory controller 125), the method 200 proceeds to operation 214; otherwise, the method 200 proceeds to operation 224.

At operation 214, the hardware memory controller (e.g., 125) sends a cache-based memory sub-system read command (e.g., SREAD command in accordance with a NVDIMM-P memory protocol) to the memory sub-system (e.g., 110) for the given memory address. In this way, the method 200 is selectively sending the cache-based memory sub-system read command to the memory sub-system (e.g., 110) based on a prior memory sub-system command (e.g., prior memory sub-system read commands) sent from the hardware memory controller (e.g., 125) to the memory sub-system (e.g., 110).

At operation 216, the hardware memory controller (e.g., 125) determines whether a cache miss response was received from the memory sub-system (e.g., 110) in response to the cache-based memory sub-system command sent by operation 214. If, at decision point 218, a cache miss response was received from the memory sub-system (e.g., 110), the method 200 proceeds to operation 220; otherwise, the method 200 proceeds to operation 222.

At operation 220, the hardware memory controller (e.g., 125) adjusts the average read latency time, which can permit the hardware memory controller to better estimate how long it takes for the memory sub-system (e.g., 110) to fetch data from a memory device (e.g., 130, 140) to the cache (e.g., 114) of the memory sub-system (e.g., 110). At operation 222, the hardware memory controller (e.g., 125) leaves the average read latency time unchanged.

At operation 224, the hardware memory controller (e.g., 125) sends a non-cache-based memory sub-system read command (e.g., XREAD command in accordance with a NVDIMM-P memory protocol) to the memory sub-system (e.g., 110) for the given memory address. For some embodiments, in response to the hardware memory controller (e.g., 125) sending the non-cache-based memory sub-system read command, the given memory address can be stored on the memory device (e.g., 126), which can indicate a likelihood that the data on the memory sub-system (e.g., 110) at the given memory address has been fetched from a memory device (e.g., 130, 140) of the memory sub-system to the cache (e.g., 114) of the memory sub-system.

Referring now to the method 300 of FIG. 3, at operation 302, a hardware memory controller (e.g., 125) of a host system (e.g., 120) receives a memory request to read data from a given memory address of a memory sub-system (e.g., 110). At operation 304, the hardware memory controller (e.g., 125) determines whether the given memory address is currently stored on a memory device (e.g., 126) of the hardware memory controller.

At operation 306, the hardware memory controller (e.g., 125) sends a cache-based memory sub-system read command to a memory sub-system (e.g., 110) for the given memory address based on the determination of operation 304. For some embodiments, operation 306 includes sending, to the memory sub-system (e.g., 110), the cache-based memory sub-system command (e.g., SREAD command in accordance with a NVDIMM-P memory protocol) for the given memory address in response to determining at operation 304 that the given memory address is currently stored on the memory device (e.g., 126).

Additionally, for some embodiments, operation 306 includes, in response to determining that the given memory address is currently stored in the memory device (e.g., 126): determining a current time accessible by the hardware memory controller (e.g., 125); accessing, from the memory device (e.g., 126), a timestamp stored in association with the given memory address; determining, based on the current time, the timestamp, and an average read latency time of the memory sub-system (e.g., 110), whether there is a likelihood that data from the given memory address is currently stored on the cache (e.g., 114) of the memory sub-system (e.g., 110); and sending, to the memory sub-system (e.g., 110), the cache-based memory sub-system command for the given memory address in response to determining that there is the likelihood that data from the given memory address is currently stored on the cache (e.g., 114) of the memory sub-system (e.g., 110).

Referring now to the method 400 of FIG. 4, at operations 402 and 404 are similar to operations 302 and 304 of the method 300 described above with respect to FIG. 3. In response to the given memory address being currently stored on the memory device (e.g., 126), the method 400 proceeds to operation 406; otherwise, the method 400 proceeds to operation 418.

At operation 406, the hardware memory controller (e.g., 125) determines a current time accessible to the hardware memory controller. At operation 408, the hardware memory controller (e.g., 125) accesses a timestamp stored on the memory device (e.g., 126) in association with the given memory address. At operation 410, the hardware memory controller (e.g., 125) determines whether there is a likelihood that data from the given memory address (of the memory sub-system 110) is currently stored on a cache (e.g., 114) of the memory sub-system (e.g., 110) based on the current time, the timestamp, and an average read latency time of the memory sub-system 110. For some embodiments, operation 410 determines there is a likelihood that data from the given memory address is currently stored on the cache (e.g., 114) of the memory sub-system (e.g., 110) when the current time (determined by operation 406) is greater than a sum of the timestamp (accessed by operation 408) and the average read latency time. As described herein, the current time being greater than a sum of the timestamp and the average read latency time can indicate that enough time has passed between a prior memory sub-system command (e.g., prior XREAD or SREAD command in accordance with a NVDIMM-P memory protocol) associated with the given memory address stored on the memory device (e.g., 126) of the memory sub-system (e.g., 110) and the recently received memory request to read data from the memory sub-system (e.g., 110) that that there is a likelihood (e.g., high likelihood) that data associated with the given memory address is presently stored in the cache (e.g., 114) as a result of the prior memory sub-system command (e.g., prior XREAD or SREAD command). Alternatively, operation 410 can determine there is not a likelihood that data from the given memory address is currently stored on the cache (e.g., 114) of the memory sub-system (e.g., 110) when the current time (determined by operation 406) is less than or equal to the sum of the timestamp (accessed by operation 408) and the average read latency time. In response to there being a likelihood (that data from the given memory address is currently stored on the cache 114), the method 400 proceeds to operation 412; otherwise, the method 400 proceeds to operation 418.

At operation 412, the hardware memory controller (e.g., 125) sends a cache-based memory sub-system read command (e.g., SREAD command in accordance with a NVDIMM-P memory protocol) to the memory sub-system (e.g., 110) for the given memory address. At operation 414, the hardware memory controller (e.g., 125) determines whether a cache miss response is received in response to the cache-based memory sub-system read command sent by operation 412. As described herein, the cache miss response can include a cache "miss" code that can be sent from the memory sub-system (e.g., 110) to the host system (e.g., 120) over a metadata signal line in accordance with a NVDIMM-P memory protocol. As also described herein, in place of the cache miss response, the memory sub-system (e.g., 110) can send a cache hit response in response to the cache-based memory sub-system command (e.g., SREAD command) sent to the memory sub-system (e.g., 110) by operation 412. For some embodiments, the cache-based memory sub-system read command includes a SREAD command in accordance with a NVDIMM-P memory protocol, and a cache hit response can include a response on a RSP_n signal line that indicates that data is ready to be read by the host system (e.g., 120) from the memory sub-system (e.g., 110).

Though not shown, in response to determining (at operation 414) that a cache miss response was not received, the hardware memory controller (e.g., 125) can leave the average read latency time of the memory sub-system (e.g., 110) unchanged.

However, in response to determining (at operation 414) that a cache miss response was received, at operation 416, the hardware memory controller (e.g., 125) adjusts an average read latency time of the memory sub-system 110. As described herein, the adjustment to the average read latency time can represent an adjustment of the expectation of the hardware memory controller (e.g., 125) as to how long it takes the memory sub-system (e.g., 110) to fetch data from a memory device (e.g., 130, 140) to the cache (e.g., 114) of the memory sub-system 110. Depending on the embodiment, the adjustment of the average read latency time can be based on (e.g., according to): an average time probability (e.g., probability curve) of the memory sub-system (e.g., 110) to fetch data from a memory device (e.g., 130, 140) to the cache (e.g., 114) of the memory sub-system (e.g., 110); an increment or decrement of predetermined amount of time; or some combination thereof.

At operation 418, the hardware memory controller (e.g., 125) sends a non-cache-based memory sub-system read command (e.g., XREAD command in accordance with a NVDIMM-P memory protocol) to the memory sub-system (e.g., 110) for the given memory address. In response to the hardware memory controller (e.g., 125) sending the non-cache-based memory sub-system read command, at operation 420, the hardware memory controller (e.g., 125) updates the memory device (e.g., 126) with the given memory address. For some embodiments, operation 420 includes the hardware memory controller (e.g., 125) causing the given memory address to be stored on the memory device (e.g., 126), which can indicate a likelihood that the data on the memory sub-system (e.g., 110) at the given memory address has been fetched from a memory device (e.g., 130, 140) of the memory sub-system to the cache (e.g., 114) of the memory sub-system.

Figure 5A:
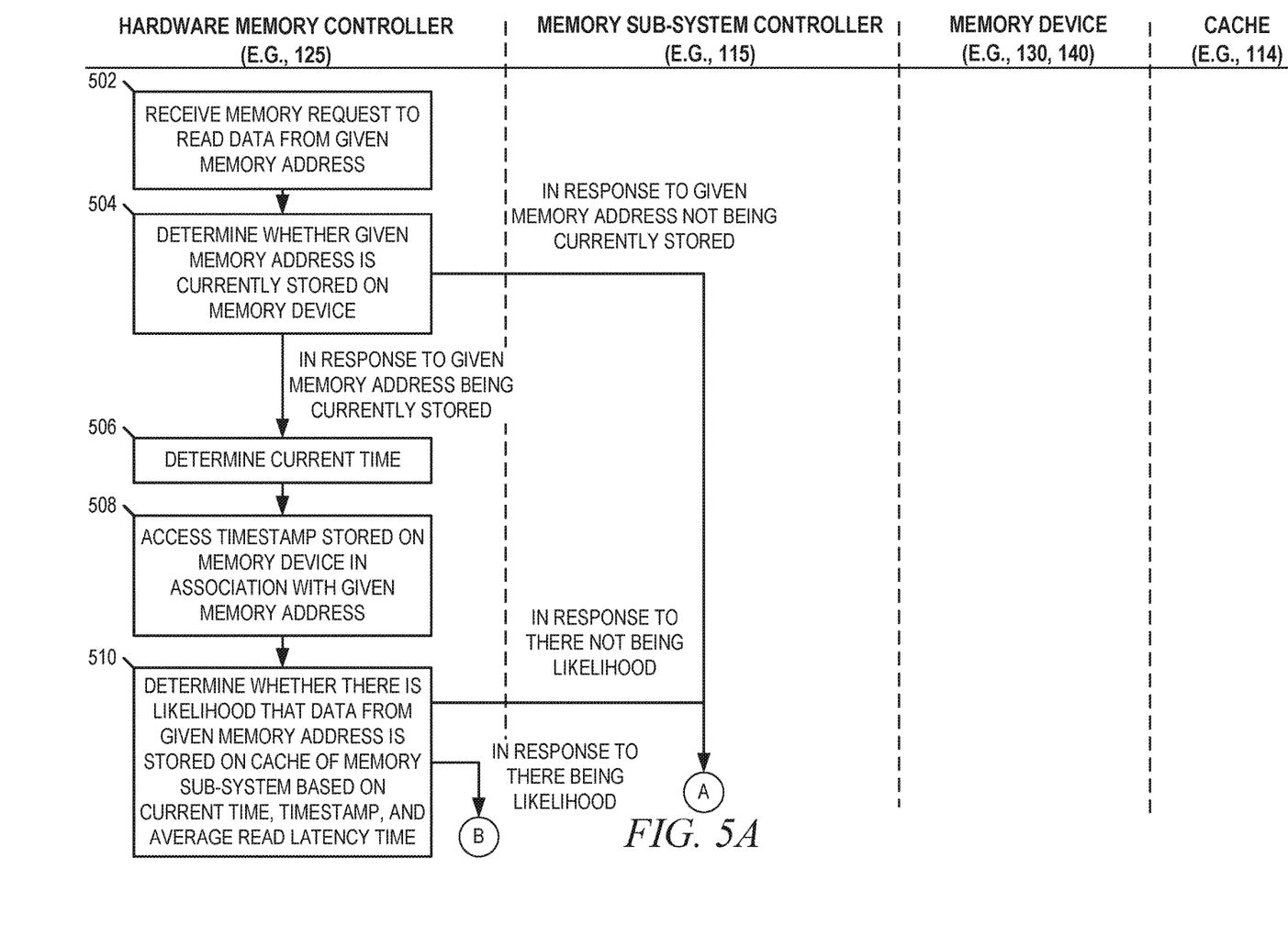
FIGS. 5A through 5C provide an interaction diagram illustrating interactions between components of the computing environment in the context of some embodiments in which a method for selectively sending a cache-based read command from a host system to a memory sub-system is performed.
Figure 5B:
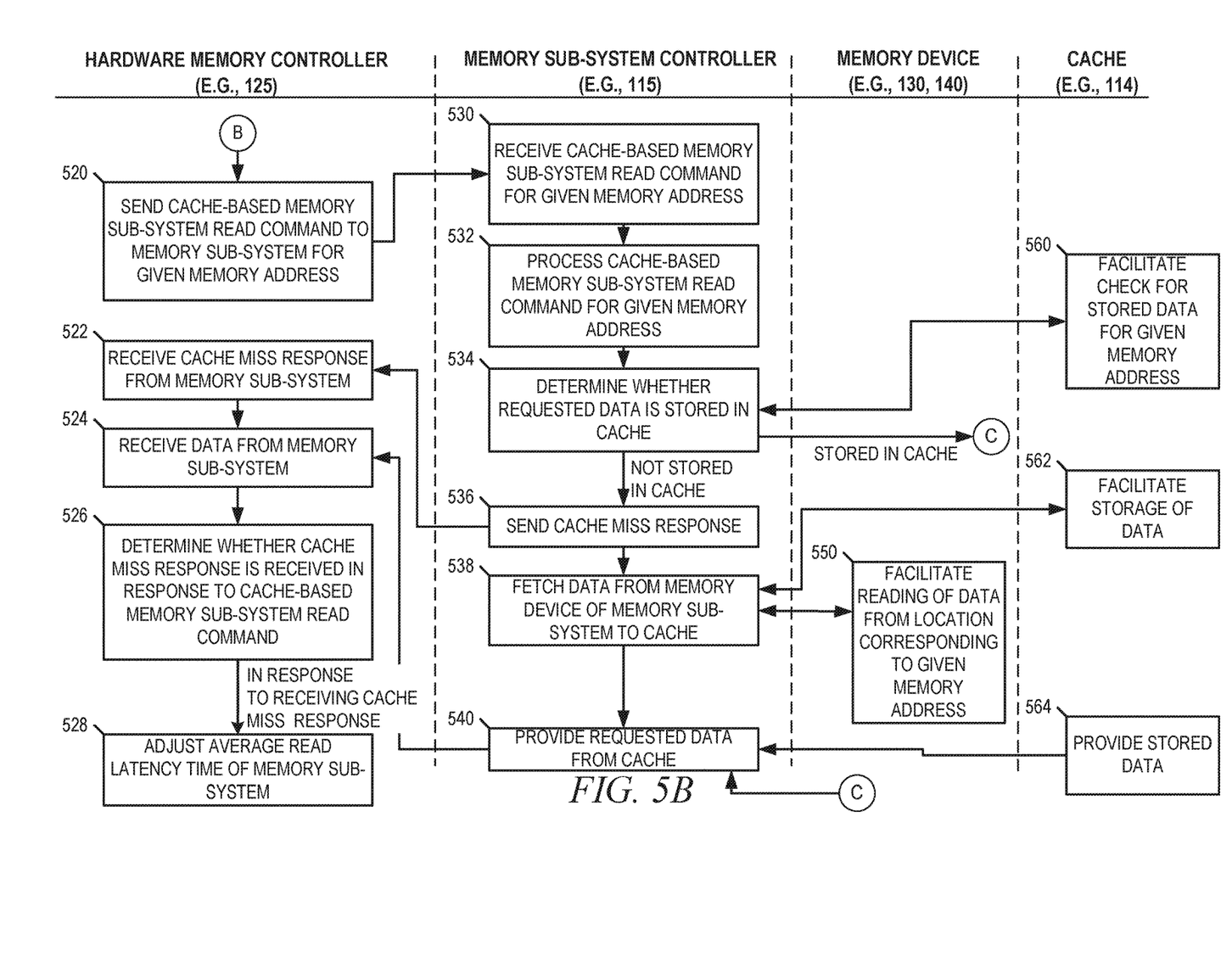
Figure 5C:
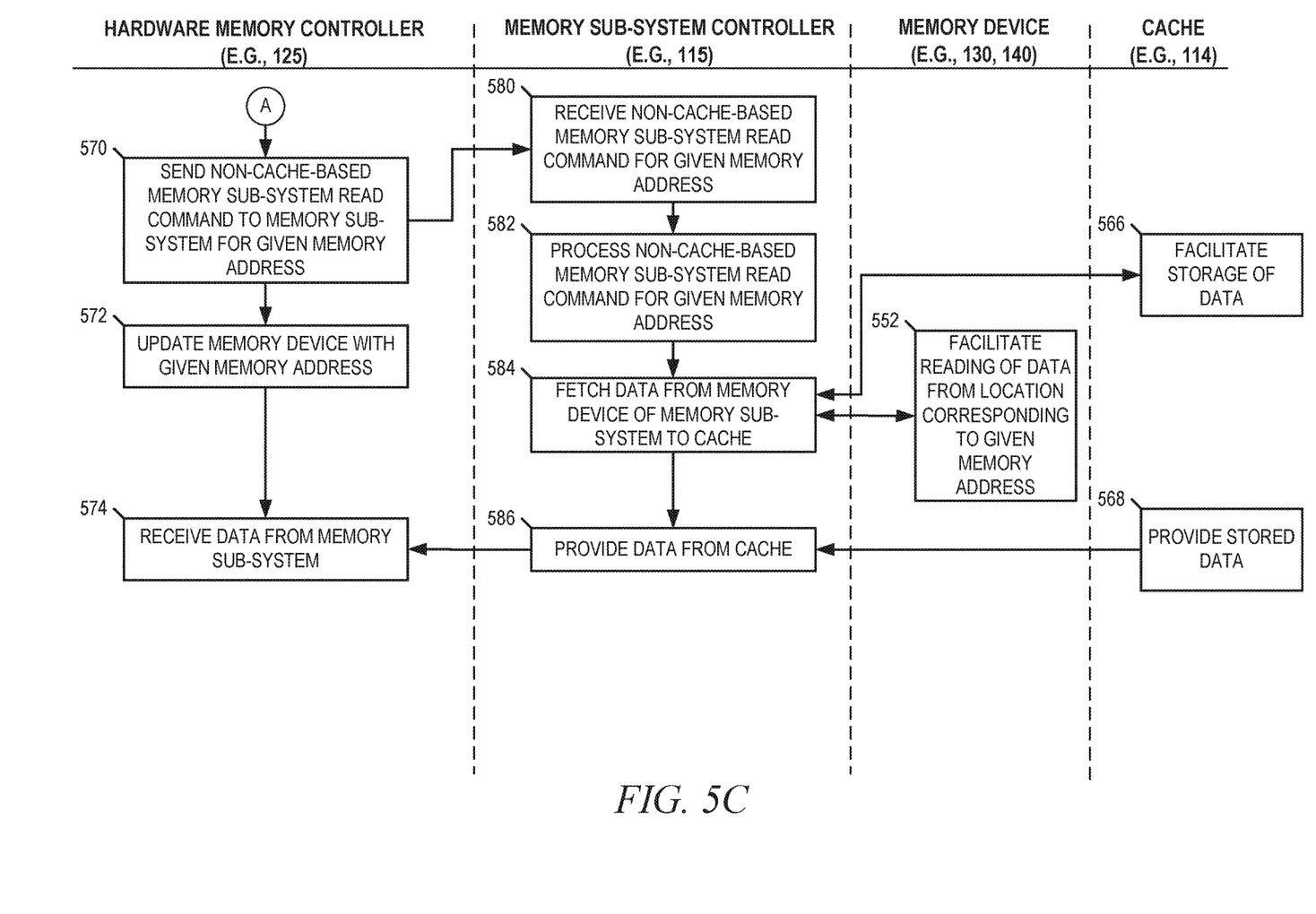

FIGS. 5A through 5C provide an interaction diagram illustrating interactions between components of the computing environment 100 in the context of some embodiments in which a method for selectively sending a cache-based read command from a host system to a memory sub-system is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a hardware memory controller (e.g., 125) of a host system (e.g., 120), a memory sub-system controller (e.g., 115), a memory device (e.g., 130, 140), a cache (e.g., 114), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. In the context of the example illustrated in FIGS. 5A through 5C, the hardware memory controller can include the hardware memory controller 125, the memory sub-system controller can include the memory sub-system controller 115, the memory device can include the memory device 130 or 140, and the cache can include the cache 114.

As shown in FIG. 5A, at operation 502, the hardware memory controller 125 receives a memory request (e.g., from processing device of the host system 120) to read data from a given memory address. At operation 504, the hardware memory controller 125 determines whether the given memory address is currently stored on a memory device (e.g., 126) of the hardware memory controller 125. In response to the given memory address being currently stored on the memory device (e.g., 126), at operation 506, the hardware memory controller 125 determines a current time. At operation 508, the hardware memory controller 125 accesses a timestamp stored on the memory device (e.g., 126) in association with the given memory address.

At operation 510, the hardware memory controller 125 determines whether there is a likelihood that data from the given memory address is stored on the cache 114 of the memory sub-system 110 based on the current time (determined by operation 506), the timestamp (accessed by operation 508), and an average read latency time of the memory sub-system 110. In response to there being the likelihood that data from the given memory address is stored on the cache 114 of the memory sub-system 110, the method proceeds to operation 520 of FIG. 5B.

Referring now to FIG. 5B, at operation 520, the hardware memory controller 125 sends a cache-based memory sub-system read command to the memory sub-system 110 for the given memory address. At operation 530, the memory sub-system controller 115 of the memory sub-system 110 receives the cache-based memory sub-system read command for the given memory address. At operation 532, the memory sub-system controller 115 processes the cache-based memory sub-system read command for the given memory address. At operation 534, the memory sub-system controller 115 determines whether the request data is stored in the cache 114. At operation 560, the cache 114 facilitates checking for stored data for the given memory address. In response to determining that the requested data is stored on the cache 114, the method proceeds to operation 540. In response to determining that the requested data is not stored on the cache 114, the method proceeds to operation 536.

At operation 536, the memory sub-system controller 115 sends a cache miss response to the hardware memory controller 125 of the host system 120. At operation 538, the memory sub-system controller 115 fetches data from the memory device (e.g., 130, 140) to the cache 114. At operation 550, the memory device (e.g., 130, 140) facilitates reading of the data from the location corresponding to the given memory address, and at operation 562, the cache 114 facilitates storage of the data.

At operation 540, the memory sub-system controller 115 provides the requested data from the cache 114 to the hardware memory controller 125 of the host system 120. At operation 564, the cache 114 provides the memory sub-system controller 115 with the stored data. For some embodiments, operation 540 includes the memory sub-system controller 115 sending a response to the hardware memory controller 125 to indicate that the requested data is ready for sending to the host system 120 and sending the requested data to the host system 120 in response to the hardware memory controller 125 sending a send signal.

At operation 522, the hardware memory controller 125 receives a cache miss response from the memory sub-system controller 115. At operation 524, the hardware memory controller 125 receives data from the memory sub-system controller 115. At operation 526, the hardware memory controller 125 determines whether a cache miss response is received in response to the cache-based memory sub-system read command. In response to receiving the cache miss response, at operation 528, the hardware memory controller 125 adjusts the average read latency time of the memory sub-system 110.

In response to determining (at operation 504) that the given memory address is not currently stored on the memory device (e.g., 126), the method proceeds to operation 570 of FIG. 5C. In response to determining (at operation 510) that there is not a likelihood that data from the given memory address is stored on the cache 114 of the memory sub-system 110, the method proceeds to operation 570 of FIG. 5C.

Referring now to FIG. 5C, at operation 570, the hardware memory controller 125 sends a non-cache-based memory sub-system read command to the memory sub-system 110 for the given memory address. At operation 572, the hardware memory controller 125 updates the memory device (e.g., 126) with the given memory address (as the non-cache-based memory sub-system command sent by operation 570 now represents a prior memory sub-system command).

At operation 580, the memory sub-system controller 115 receives the non-cache-based memory sub-system read command for the given memory address. At operation 582, the memory sub-system controller 115 processes the non-cache-based memory sub-system read command for the given memory address. At operation 584, the memory sub-system controller 115 fetches data from the memory device (e.g., 130, 140) to the cache 114. At operation 552, the memory device (e.g., 130, 140) facilitates reading of the data from location corresponding to the given memory address, and at operation 566, the cache 114 facilitates storage of the data.

At operation 586, the memory sub-system controller 115 provides the requested data from the cache 114 to the hardware memory controller 125 of the host system 120. At operation 568, the cache 114 provides the memory subsystem controller 115 with the stored data. At operation 574, the hardware memory controller 125 eventually receives the request data from the memory sub-system 110.

Figure 6:
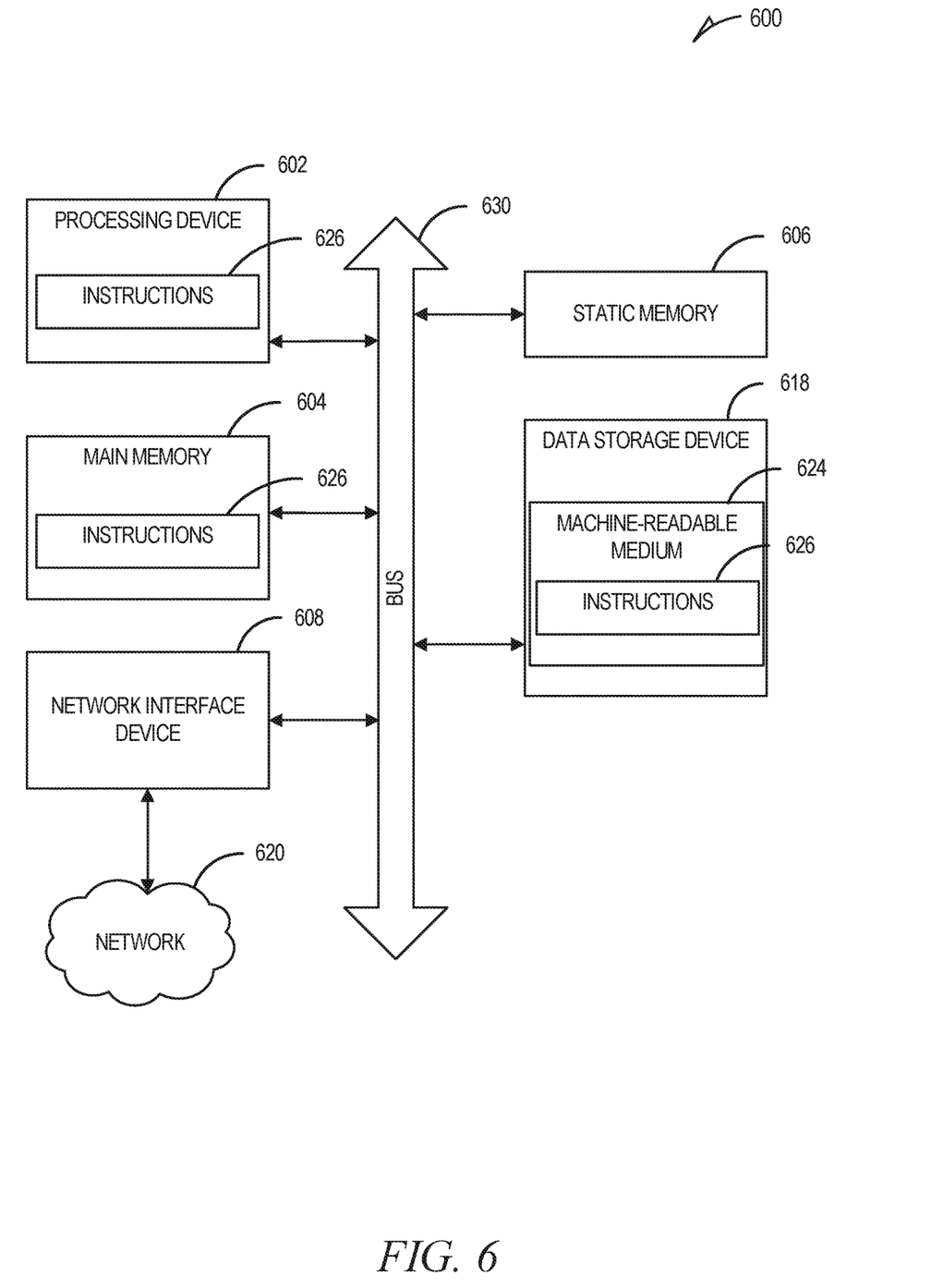
FIG. 6 is a block diagram of an example computer system in which embodiments of the present disclosure may operate.

FIG. 6 illustrates an example machine in the form of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to software). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

The processing device 602 represents one or more general-purpose processing devices such as a microprocessor, a central processing unit, or the like. More particularly, the processing device 602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), a network processor, or the like. The processing device 602 is configured to execute instructions 626 for performing the operations and steps discussed herein. The computer system 600 can further include a network interface device 608 to communicate over a network 620.

The data storage device 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage device 618, and/or main memory 604 can correspond to the memory sub-system 110 of FIG. 1.

In one embodiment, the instructions 626 include instructions to implement functionality relating to selectively sending a cache-based read command to a memory sub-system as described herein. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving, at a hardware memory controller, a memory request to read data from a given memory address of a memory sub-system coupled to the hardware memory controller, the hardware memory controller comprising a memory device to store one or more memory addresses associated with one or more past memory sub-system commands sent to the memory sub-system; and
   in response to receiving the memory request:
      determining, by the hardware memory controller, whether the given memory address is currently stored on the memory device; and
      in response to determining that the given memory address is currently stored in the memory device:
         determining a current time accessible by the hardware memory controller;
         accessing from the memory device, a timestamp stored in association with the given memory address;
         determining, based on the current time, the timestamp, and an average read latency time of the memory sub-system, whether there is a likelihood that data from the given memory address is currently stored on a cache of the memory sub-system; and
         sending, by the hardware memory controller to the memory sub-system, at least one of a cache-based memory sub-system command for the given memory address or a non-cache-based memory sub-system command for the given memory address based on the determining of whether there is the likelihood.

2. The method of claim 1, wherein the sending the cache-based memory sub-system command for the given memory address based on the determining whether the given memory address is currently stored in the memory device comprises:
   sending the cache-based memory sub-system command to the memory sub-system for the given memory address in response to determining that the given memory address is currently stored in the memory device.

3. The method of claim 1, wherein the sending the at least one of the cache-based memory sub-system command or the non-cache-based memory sub-system command based on the determining of whether there is the likelihood comprises:
   sending, to the memory sub-system, the cache-based memory sub-system command for the given memory address in response to determining that there is the likelihood.

4. The method of claim 3, further comprising:
   receiving, from the memory sub-system, a cache miss response in response to the sending the cache-based memory sub-system command to the memory sub-system; and
   adjusting the average read latency time based on receiving the cache miss response.

5. A system comprises:
   a processing device; and
   a hardware memory controller for processing memory requests generated by the processing device, the hardware memory controller comprising:
      a memory device to store one or more memory addresses associated with one or more past memory sub-system commands sent to a memory sub-system coupled to the hardware memory controller; and
      logic that performs operations comprising:
         receiving a memory request to read data from a given memory address of the memory sub-system; and
         in response to receiving the memory request:
            determining whether the given memory address is currently stored on the memory device; and
            in response to determining that the given memory address is currently stored in the memory device:
               determining a current nixie accessible by the hardware memory controller;
               accessing, from the memory device, a timestamp stored in association with the given memory address;
               determining, based on the current time, the timestamp, and an average read latency time of the memory sub-system, whether there is a likelihood that data from the given memory address is currently stored on a cache of the memory sub-system; and
               sending, to the memory sub-system, at least one of a cache-based memory sub-system command for the given memory address or a non-cache-based memory sub-system command for the given memory address based on the determining of whether there is the likelihood.

6. The system of claim 5, wherein the sending the cache-based memory sub-system command for the given memory address based on the determining whether the given memory address is currently stored on the memory device comprises:
   sending, to the memory sub-system, the cache-based memory sub-system command for the given memory address in response to determining that the given memory address is currently stored on the memory device.

7. The system of claim 5, wherein the sending the at least one of the cache-based memory sub-system command or the non-cache-based memory sub-system command based on the determining of whether there is the likelihood comprises:

sending, to the memory sub-system, the cache-based memory sub-system command for the given memory address in response to determining that there is the likelihood.

8. The system of claim 5, wherein the determining, based on the current time, the timestamp, and the average read latency time, whether there is the likelihood that data from the given memory address is currently stored on the cache of the memory sub-system comprises:
   determining whether the current time is greater than a sum of the timestamp and the average read latency time; and
   determining that there is the likelihood that data from the given memory address is currently stored on the cache of the memory sub-system in response to the current time being greater than the sum.

9. The system of claim 7, wherein the operations further comprise:
   determining whether a cache miss response is received, from the memory sub-system, in response to the sending the cache-based memory sub-system command to the memory sub-system; and
   adjusting the average read latency time based on the determining that the cache miss response is received.

10. The system of claim 5, wherein the cache-based memory sub-system command comprises a speculative read (SREAD) command in accordance with a Non-Volatile Dual In-Line Memory Module-P (NVDIMM-P) memory protocol.

11. The system of claim 5, wherein the operations further comprise:
   sending the non-cache-based memory sub-system command to the memory sub-system for the given memory address in response to determining that the given memory address is not currently stored in the memory device.

12. The system of claim 11, wherein the non-cache-based memory sub-system command comprises an XREAD command in accordance with a Non-Volatile Dual In-Line Memory Module-P (NVDIMM-P) memory protocol.

13. The system of claim 11, wherein the operations further comprise:
   updating the memory device with the given memory address.

14. The system of claim 5,
   wherein the sending at least one of the cache-based memory sub-system command or the non-cache-based memory sub-system command based on the determining of whether there is the likelihood comprises:
      sending, to the memory sub-system, the non-cache-based memory sub-system command for the given memory address in response to determining that there is not the likelihood.

15. The system of claim 5, wherein the memory device further stores a timestamp for at least one of the of the one or more memory addresses stored on the memory device.

16. The system of claim 5, herein each respective memory address, of the one or more memory addresses stored on the memory device, is stored as a tag on the memory device, the tag identifying the respective memory address.

17. The system of claim 16, wherein the tag of the respective memory address is generated based on at least portion of the respective memory address.

18. The system of claim 5, wherein the system comprises a host system.

19. A hardware memory controller comprising:
   a hardware interface for receiving a memory request generated by a processing device;
   a memory device to store one or more memory addresses associated with one or more past memory sub-system commands sent to a memory sub-system coupled to the hardware memory controller; and
   logic that performs operations comprising:
      receiving, by the hardware interface, a memory request to read data from a given memory address of the memory sub-system; and
      in response to receiving the memory request:
         determining whether the given memory address is currently stored in the memory device; and
         in response to determining that the given memory address is currently stored in the memory device:
            determining a current time accessible by the hardware memory controller;
            accessing, from the memory device, a timestamp stored in association with the given memory address;
            determining, based on the current time, the timestamp, and an average read latency time of the memory sub-system, whether there is a likelihood that data from the riven memory address is currently stored on a cache of the memory sub-system; and
            sending, to the memory sub-system, at least one of a cache-based memory sub-system command for the given memory address or a non-cache-based memory sub-system command for the given memory address based on the determining of whether there is the likelihood.

20. The hardware memory controller of claim 19, wherein the memory device comprises a content addressable memory (CAM).

* * * * *